US005631700A

United States Patent [19]
Sato

[11] Patent Number: 5,631,700
[45] Date of Patent: May 20, 1997

[54] CAMERA HAVING PREVIEW FUNCTION

[75] Inventor: Koichi Sato, Tokyo, Japan

[73] Assignee: Asahi Kogaku Kogyo Kabushiki Kaisha, Tokyo, Japan

[21] Appl. No.: 577,152

[22] Filed: Dec. 22, 1995

[30] Foreign Application Priority Data

Dec. 28, 1994 [JP] Japan ............................ 6-339362
Jan. 6, 1995 [JP] Japan ............................ 7-016549

[51] Int. Cl.$^6$ .................. H04N 3/02; H04N 5/30; H04N 5/74
[52] U.S. Cl. ............... 348/222; 348/294; 358/404; 358/474; 358/494
[58] Field of Search ..................... 348/222, 294; 358/404, 474, 494; H04N 3/02, 5/30, 5/74

[56] References Cited

U.S. PATENT DOCUMENTS

| 4,418,358 | 11/1983 | Poetsch et al. | 358/80 |
| 4,597,014 | 6/1986 | Suzuki | 358/213 |
| 4,658,301 | 4/1987 | Toyoda et al. | 379/100 |
| 4,901,157 | 2/1990 | Ohmori | 358/474 |
| 5,339,169 | 8/1994 | Meguro et al. | 358/404 |
| 5,383,031 | 1/1995 | Kida et al. | 358/404 |
| 5,424,156 | 6/1995 | Aoki et al. | 430/59 |

FOREIGN PATENT DOCUMENTS

| 0327236 | 8/1989 | European Pat. Off. |
| 229081 | 1/1990 | Japan |
| 5-2280 | 1/1993 | Japan |
| 5-24706 | 4/1993 | Japan |
| 5150251 | 6/1993 | Japan |
| 6313894 | 11/1994 | Japan |

OTHER PUBLICATIONS

English Language Abstract of JP No. 5-150251.

Primary Examiner—Glenton B. Burgess
Attorney, Agent, or Firm—Greenblum & Bernstein, P.L.C.

[57] ABSTRACT

An image sensing operation control device has an electro-developing recording medium to electronically develop an image formed by a photographing lens. The image is scanned from the electro-developing recording medium through a line sensor. Image signals corresponding to the image are temporarily stored in a memory, and are outputted from the memory to an external device. During the scanning operation, the line sensor can be stopped. An image corresponding to the image signals stored in the memory so far prior to the stopping operation is outputted to a video monitor device, so that it can be checked whether a desired image is being obtained by the electro-developing recording medium.

20 Claims, 14 Drawing Sheets

CAMERA HAVING PREVIEW FUNCTION

BACKGROUND OF THE INVENTION

1. Field of the Invention

The present invention relates to a device which is provided in an electronic still video camera, for example, and which reads an image developed on a recording medium by a scanning operation.

2. Description of the Related Art

Conventionally, silver halide photographic material is generally used as a material for recording an optical image. Silver halide photographic material has high optical sensitivity and high resolution, and the economical efficiency thereof is excellent. However, silver halide photographic material has drawbacks in that not only is the developing process cumbersome but also a visible image cannot be obtained at the same time as photography. A dry-type developing method has been developed to simplify the developing process. However, simultaneous development in which a visible image is obtained upon photography is impossible in the dry-type developing method.

On the other hand, as non-silver-halide photographic materials, there are known electrophotographic materials, diazotype photographic materials and free-radical photographic materials and so on. In these materials, however, there is no material which has advantageous characteristics like silver halide photographic material, while being able to simultaneously develop and keep a visible image. Note that, electrophotographic materials have been used mainly in copying machines, since they can perform dry-type development and can simultaneously develop an electrostatic latent image, which is obtained by exposure, using toner.

In such electrophotographic materials, recently, a photographic material has been developed in which a recording material made of the photographic material is electronically and directly developed similarly to a silver halide photographic material, so that the developed visible image can be immediately seen or recorded. Such a recording material in which a visible image is electronically developed is referred to as an electro-developing recording material in this specification.

Japanese Unexamined Patent Publication No. 5-2280 and U.S. Pat. No. 5,424,156, for example, discloses a recording material which is a combination of an electrostatic information recording material and an electric charge keeping medium, the electrostatic information recording material having a photoconducting layer and an inorganic oxide material layer, and the electric charge keeping medium having a liquid crystal display. In this structure, when the electrostatic information recording material is exposed while an electric voltage is applied to the electrostatic information recording material and the electric charge keeping medium, electric charge in accordance with the amount of incident light is generated in the electrostatic information recording material. Since the intensity of electric field applied to the liquid crystal display facing the electrostatic information recording material varies in accordance with the generated electric charge, an image corresponding to the amount of light distribution is indicated or developed on the liquid crystal display.

In a camera in which an electro-developing recording medium is mounted, it can not be checked whether or not the recording medium has been recorded until a reading operation in which one frame's worth of image signals is read out from the recording medium has been completed.

On the other hand, in the camera, when an image developed on the electro-developing recording medium is read out therefrom, an image signal corresponding to the image is temporarily stored in a memory, and is outputted to an external device. If the image developed on the electro-developing recording medium is read out therefrom while other image signals stored in the memory are read out therefrom, the image developed on the electro-developing recording medium cannot be stored in the memory, and thus the reading operation for the electro-developing recording medium is useless. Conversely, if an image stored in the memory is read out therefrom while another image developed on the electro-developing recording medium is read out therefrom to store the corresponding image signal in the memory, the image signals corresponding to the other image cannot be outputted to the external device. Namely, a meaningless image signal is outputted, and thus the desired image is not outputted to the external device.

SUMMARY OF THE INVENTION

Therefore, an object of the present invention is to provide an image sensing operation control device in which it can be checked whether or not the recording medium has been recorded before a reading operation in which one frame's worth of image signals is read out from the recording medium is completed.

According to the present invention, there is provided an image sensing operation control device comprising, an electro-developing recording medium, an image sensor, moving means, a memory, stopping means and indicating means.

The electro-developing recording medium electronically develops an image formed thereon. The image sensor is provided for sensing a part of the developed image. The moving means moves the image sensor in a scanning direction substantially perpendicular to a longitudinal direction of the image sensor so that all of the developed image is sensed. The memory is provided for storing image signals corresponding to the developed image sensed by the image sensor. The stopping means stops a scanning operation of the moving means even if the whole of the developed image has not been sensed by the image sensor. The indicating means indicates the stored image signals on a display device.

Another object of the present invention is to provide an image sensing operation control device in which the storing operation is prevented from being useless, and the desired image is always outputted therefrom to the external device.

According to the present invention, there is provided an image sensing operation control device comprising an electro-developing recording medium, an image sensor, moving means, a memory, and control means.

The electro-developing recording medium electronically develops an image formed thereon. The image sensor is provided for sensing a part of the developed image. The moving means moves the image sensor in a scanning direction substantially perpendicular to a longitudinal direction of the image sensor so that all of the developed image is sensed. The memory is provided for storing image signals corresponding to the developed image sensed by the image sensor. The reading means reads the image signals from the memory. The control means controls operations of the image sensors the storing means and the reading means, in such a manner that all of the image sensor, the storing means and the reading means are prohibited from being performed at the same time.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
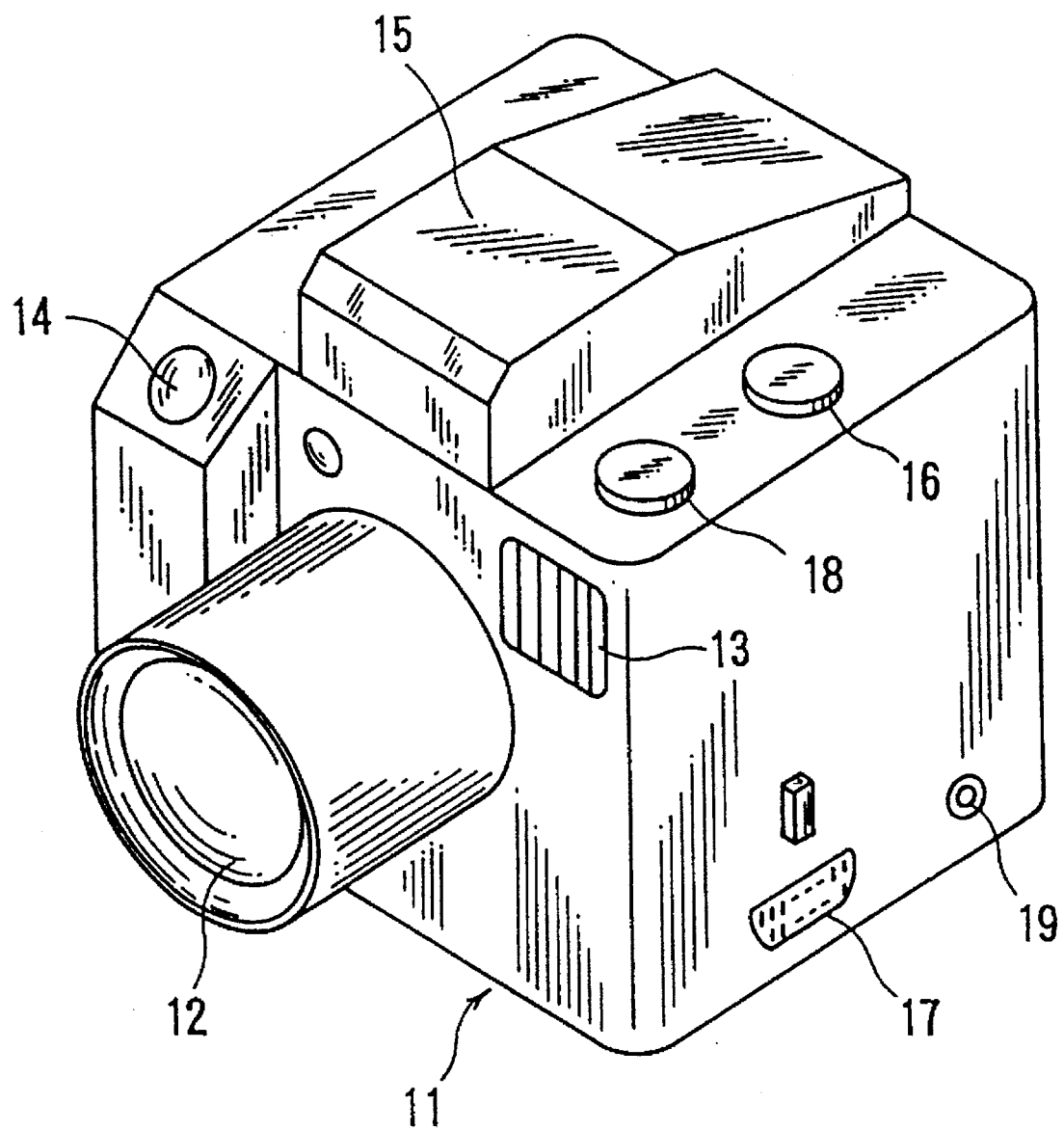
FIG. 1 is a perspective view showing a still video camera to which an image signal generating device of a first embodiment according to the present invention is applied.

FIG. 1 is an external view of a still video camera to which an image signal generating device of a first embodiment according to the present invention is applied.

When viewing a camera body 11 from a front side on the front surface of the camera body 11, a photographing optical system 12 including a photographing lens system and so on is provided on approximately the central portion of the front surface, and an electronic flash 13 is disposed on a portion to the right of and above the photographing optical system 12. A release switch 14 is provided on the side opposite to the electronic flash 13. On the upper surface of the camera body 11, a view finder 15 is provided at the center portion thereof, and a scanner start/stop switch 16 and a scanner reset switch 18 are provided on a side of the view finder 15. On a side surface of the camera body 11, an output terminal 17 and a video signal output terminal 19 are provided on a lower portion thereof so that an image signal obtained by this camera is outputted to an external recording device or an external video monitor device 71 (FIG. 2).

Figure 2:
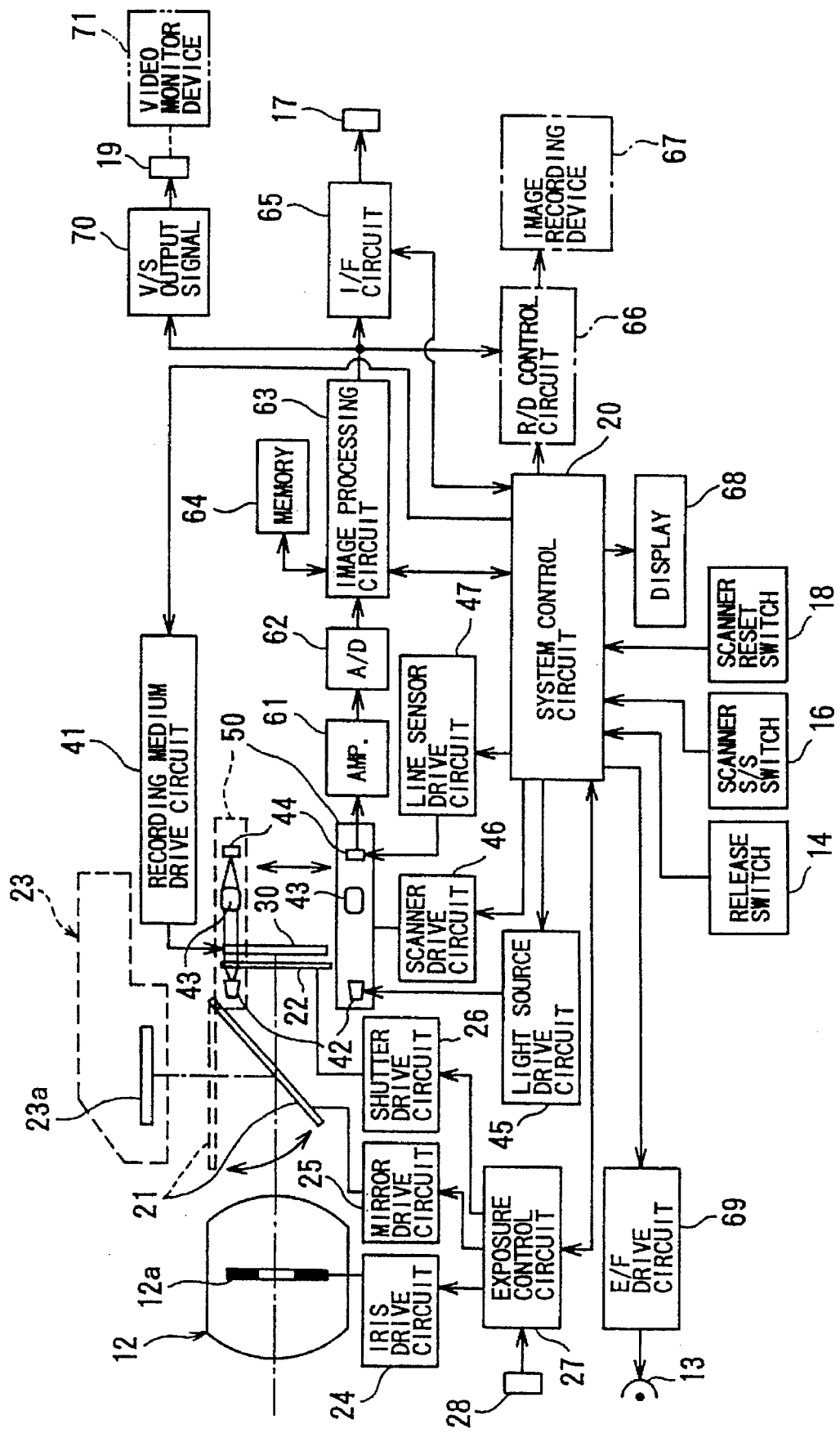
FIG. 2 is a block diagram of the still video camera shown in FIG. 1.

FIG. 2 is a block diagram of the still video camera, in which a system control circuit 20 including a microcomputer or micro-processor is mounted to control the still video camera as a whole.

The photographing optical system 12 has a plurality of lens groups and an aperture 12a. An electro-developing recording medium 30 is disposed behind the photographing optical system 12, and a quick return mirror 21 is placed between the photographing optical system 12 and the electro-developing recording medium 30. A shutter 22 is provided between the quick return mirror 21 and the electro-developing recording medium 30. A focusing glass 23a included in a view finder optical system 23 is disposed above the quick return mirror 21.

The aperture 12a, the quick return mirror 21 and the shutter 22 are driven by an iris drive circuit 24, a mirror drive circuit 25 and a shutter drive circuit 26, respectively, which are controlled by an exposure control circuit 27.

The exposure control circuit 27 is operated in accordance with a command signal outputted by the system control circuit 20. Namely, when an exposure is controlled, the opening degree of the aperture 12a is adjusted by the iris drive circuit 24 under control of the exposure control circuit 27 based on an output signal of a photometry sensor 28.

The quick return mirror 21 is usually set to a down position (an inclining position shown by the solid line in the drawing), so that a light beam passing through the photographing optical system 12 is led to the view-finder optical system 23 so that an object to be photographed can be observed by the photographer. When a photographing operation is carried out, the quick return mirror 21 is rotated upward by the mirror drive circuit 25 and set to an up position (a horizontal position shown by the broken line in the drawing), so that the light beam is led to the electro-developing recording medium 30.

The shutter 22 is usually closed, and upon a photographing operation, the shutter 22 is opened for a predetermined period by the shutter drive circuit 26 under control of the exposure control circuit 27, and thus, the light beam passing through the photographing optical system 12 enters a light receiving surface of the electro-developing recording medium 30, thus forming an image thereon.

An electric voltage is applied to the electro-developing recording medium 30 under control of a recording medium drive circuit 41. By exposing the electro-developing recording medium 30 while applying the voltage, an image formed by the photographing optical system 12 is developed on the electro-developing recording medium 30 as a visible image. Note that the recording medium drive circuit 41 is operated in accordance with a command signal outputted by the system control circuit 20.

A scanning mechanism 50 is provided close to the electro-developing recording medium 30. A light source 42 includes an LED (light emitting diode) and a collimator lens, and emits a parallel light beam. The light source 42, a scanner optical system 43 and a line sensor 44 are supported by the scanning mechanism 50, and are moved along the electro-developing recording material 30 by a scanning operation of the scanning mechanism 50.

The line sensor 44 may be a one dimensional CCD sensor of 2000 pixels, for example. The line sensor 44 may be of suitable length to completely cover and extend over one horizontal scanning line of the electro-developing recording medium 30. The line sensor 44 serves as a photoelectric-conversion device, which converts an optical image to an electric signal. The light source 42 can be moved along the front surface of the shutter 22 or the front surface of the electro-developing recording medium 30, and the line sensor 44 can be moved along the rear surface of the electro-developing recording medium 30. The scanner optical system 43 is disposed between the light source 42 and the line sensor 44. When scanning is carried out by the scanning mechanism 50, the scanner optical system 43 is positioned between the electro-developing recording medium 30 and the line sensor 44, so that the image developed by the electro-developing recording medium 30 is illuminated by the light source 42 and is formed on the light receiving surface of the line sensor 44 due to an operation of the scanner optical system 43. Namely, the scanner optical system 43 is disposed on the optical path of the light beam which passes through the electro-developing recording medium 30, and the line sensor 44 is moved in an imaging plane, on which an image is formed, by the scanning optical system 43.

ON and OFF control of the light source 42 is performed by a light source drive circuit 45. Control of the reading operation of the pixel signal generated in the line sensor 44 is carried out by a line sensor drive circuit 47. Control of the movement of the scanning mechanism 50 is performed by a scanner drive circuit 46. The circuits 45, 46 and 47 are controlled by the system control circuit 20.

A pixel signal read out from the line sensor 44 is amplified by an amplifier 61, and converted to a digital signal by an A/D converter 62. The digital pixel signal is subjected to a shading correction, a gamma correction and so on by an image processing circuit 63 under control of the system control circuit 20, and then, is temporarily stored in a memory 64. The memory includes an EEPROM in which correction data for the shading correction is stored. Note that the memory 64 may have a storage capacity equal to one horizontal scanning line outputted from the line sensor 44, or may have a storage capacity of one frame's worth of image signals.

The pixel signal outputted from the memory 64 is inputted into an interface circuit 65 through the image process circuit 63, so that the pixel signal is subjected to a predetermined process such as a format conversion, and can be outputted to an external computer (not shown) through the output terminal 17. The pixel signal outputted from the image process circuit 63 is subjected to a predetermined process such as an image compression and a format conversion in a recording device control circuit 66, so that the pixel signal can be recorded on a recording medium such as an IC memory card, for example, in an image recording device 67. Further, a synchronizing signal is added to the pixel signal outputted from the image process circuit 63 and then the pixel signal is subjected to a format conversion in a video signal output circuit 70, so that the pixel signal can be outputted to the external video monitor device 71. The interface circuit 65, the recording device control circuit 66 and the video signal output circuit 70 are operated in accordance with a command signal outputted from the system control circuit 20.

The release switch 14, the scanner start/stop switch 16 and the scanner reset switch 18 are connected to the system control circuit 20, and an operation such as a photography operation, a reading operation and so on are carried out in accordance with an operation of the switches 14, 16, or 18. A display device 68 for indicating various setting conditions of the still video camera, and an electronic flash drive circuit 69 for performing a flash control of the electronic flash 13 are also connected to the system control circuit 20.

Figure 3:
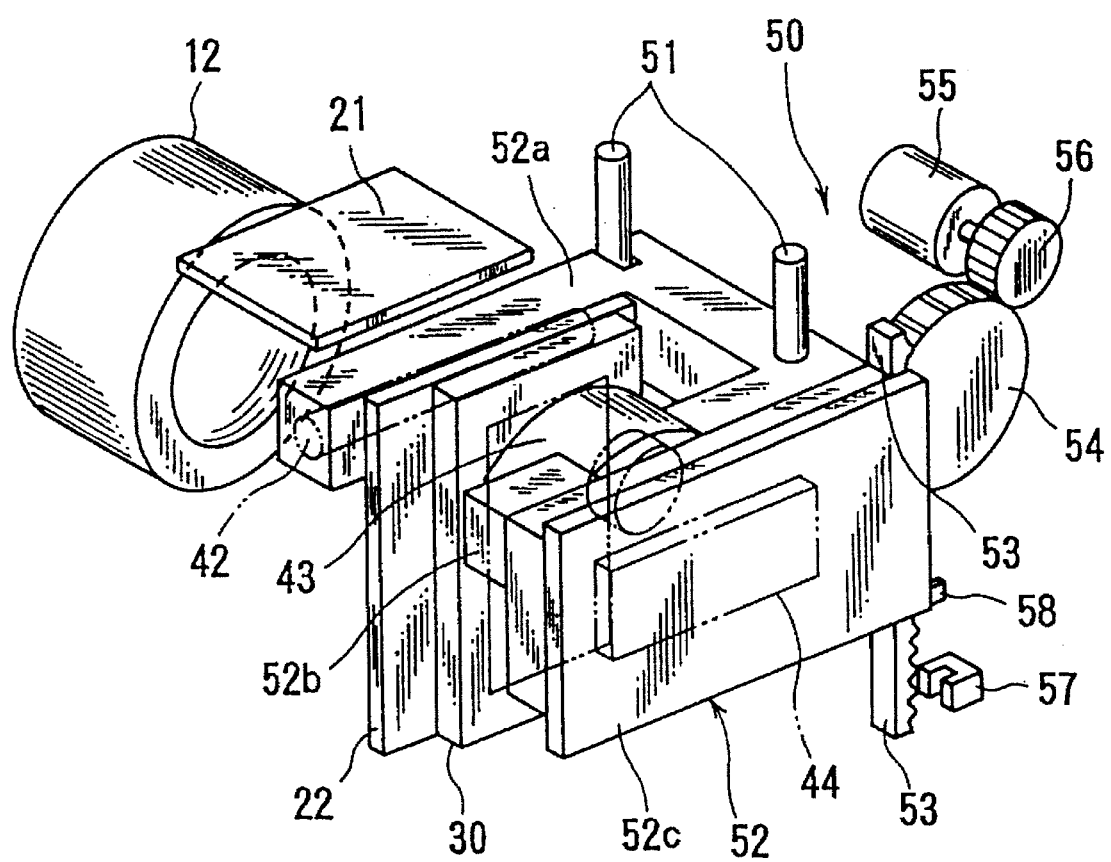
FIG. 3 is a perspective view showing a scanning mechanism and members provided around the mechanism.

FIG. 3 shows the structure of the scanning mechanism 50 and members provided around the mechanism 50.

The scanning mechanism 50 has a moving member 52 which is slidably supported by a pair of guide shafts 51 and has first and second leg portions 52a and 52b and a support portion 52c. The first leg portion 52a is extended between the quick return mirror 21 and the shutter 22, and the second leg portion 52b is extended behind the eletro-developing recording medium 30. The support portion 52c is provided behind the second leg portion 52b. The light source 42, the scanner optical system 43 and the line sensor 44 are attached to the first leg portion 52a, the second leg portion 52b and the support portion 52c, respectively. The light source 42 and the line sensor 44 are extended it horizontal directions, respectively, to permit scanning of each of the horizontal scanning lines of the image formed by the electro-developing recording medium 30 during a scanning operation. A rack 53 fixed to the moving member 52 is meshed with a pinion 54 which is meshed with a gear 56 provided on an output shaft of a scan drive motor 55.

A projection plate 58 is provided on a side surface of the support portion 52c. A photo-interrupter 57 is disposed beside the support portion 52c and a position corresponding to an initial position of the scanning mechanism 50. At the initial position, the line sensor 44 is retracted away from the recording area of the electro-developing recording medium 30. The photo-interrupter 57 has a light-emitting element and a photoreceptor element so that a light beam emitted from the light-emitting element is received by the photoreceptor element. The light beam is blocked by the projection plate 582 so that a signal indicating the initial position is outputted by the photo-interrupter 57.

In an operation other than a photographing operation, or when reading out of an image from the electro-developing recording medium 30 is not performed, the moving member 52 is positioned offset from a path between the photographing optical system 12 and the electro-developing recording medium 30, the position (i.e., the initial position) being below the electro-developing recording medium 30, for example. When a photographing operation has been completed and an image has been developed in the electro-developing recording medium 30, the scan drive motor 55 is operated to rotate gear 56, the moving member 52 is moved upward so that a scan of the line sensor 44 is carried out, and the line sensor 44 is moved in a direction perpendicular to the longitudinal direction of the line sensor 44. After this scan is completed, the moving member 52 is returned to the initial position.

Figure 4:
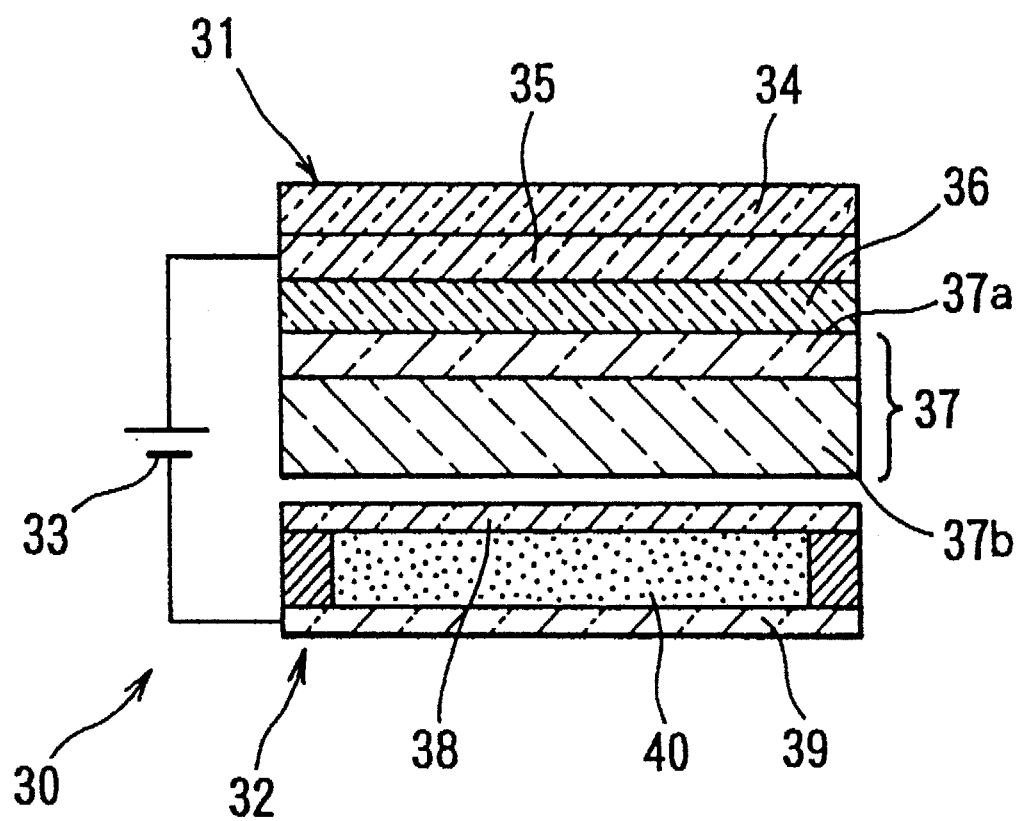
FIG. 4 is a view showing a structure of an electro-developing recording medium.

FIG. 4 shows a structure of the electro-developing recording medium 30, and is the same as that shown in Japanese Unexamined Patent Publication No. 5-2280 and U.S. Pat. No. 5,424,156, the disclosures of which are expressly incorporated herein by reference in their entirety.

The electro-developing recording medium 30 has an electrostatic information recording medium 31 and an electric charge keeping medium 32, and an electric voltage is applied thereto by a power source 33. The electric power source 33 corresponds to the recording medium drive circuit 41, so that an ON-OFF control of the electric power source 33 is an operation in which the recording medium drive circuit 41 applies a recording medium activating signal (a voltage signal) to the electro-developing recording medium 30.

The electrostatic information recording medium 31 is formed by laminating a base plate 34, an electrode layer 35, an inorganic oxide material layer 36 and a photoconducting layer 37. The photoconducting layer 37 is formed by laminating an electric charge generating layer 37a and an electric charge transferring layer 37b. The electric charge keeping medium 32 is formed by confining liquid crystal 40 between a liquid crystal supporting plate 38 and a liquid crystal electrode layer 39. The electric charge transferring layer 37b of the photoconducting layer 37 and the liquid crystal supporting plate 38 of the electric charge keeping medium 32 face each other with a small gap therebetween.

When the electric power source 33 is turned ON, an electric voltage is applied between the electrode layer 35 and the liquid crystal electrode layer 39, i.e., between the electrostatic information recording medium 31 and the electric charge keeping medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal display 40 changes in accordance with the electric charge, the image is indicated on the liquid crystal display 40 as a visible image, and thus, an image of an object is developed. Namely, the visible image is generated in accordance with the electric charge.

The electric charge keeping medium 32 is a liquid crystal display having a memory-type liquid crystal, and thus, the developed visible image is kept therein even if the electric field is removed. In the liquid crystal display, the developed visible image can be deleted by heating the liquid crystal display, using a heating device (not shown) at a predetermined temperature. In such a case, the same electric charge keeping medium 32 can be used repeatedly.

Figure 5A:
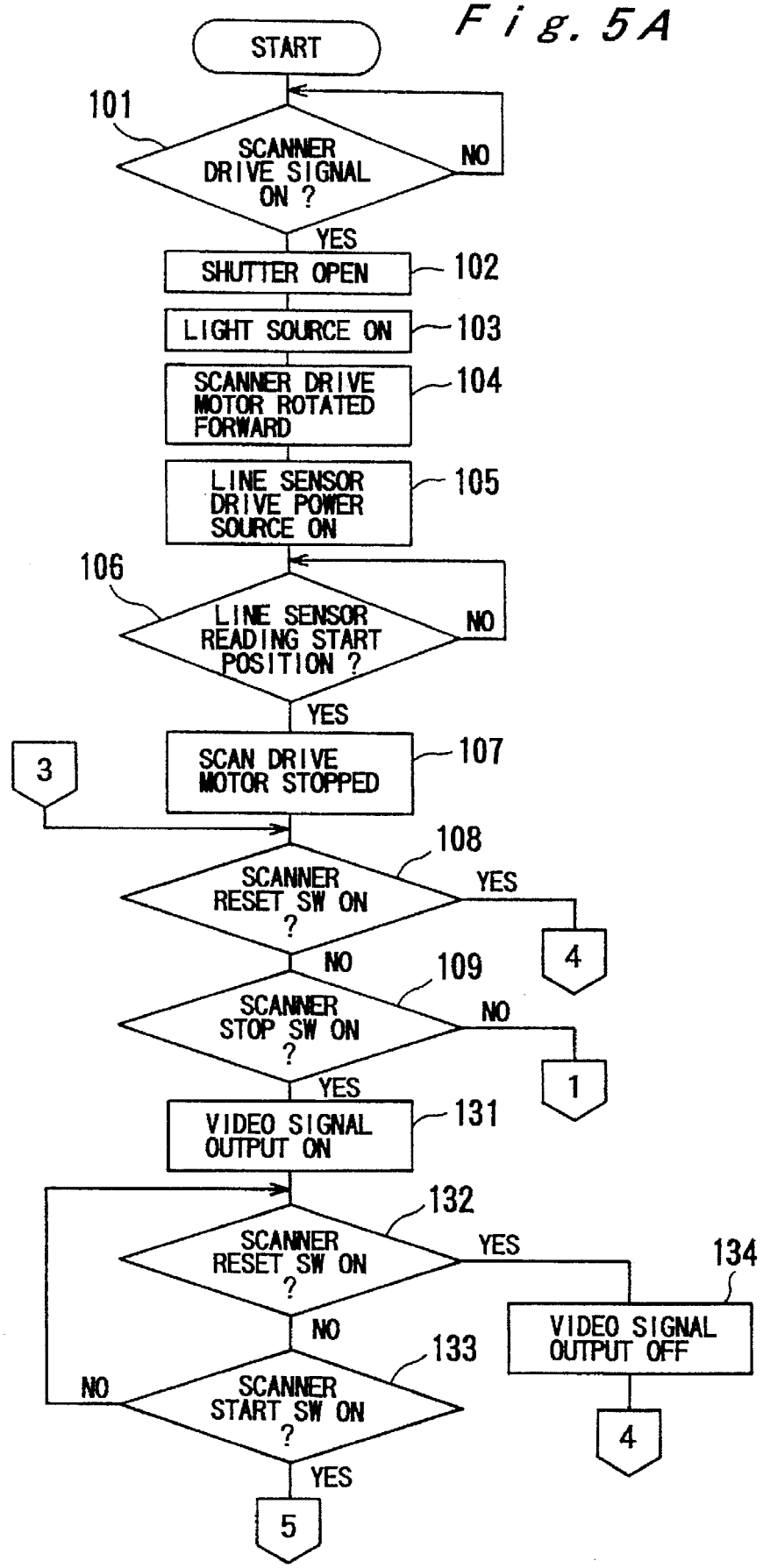
FIG. 5A is a first part of a flowchart of a reading operation of the first embodiment.
Figure 5B:
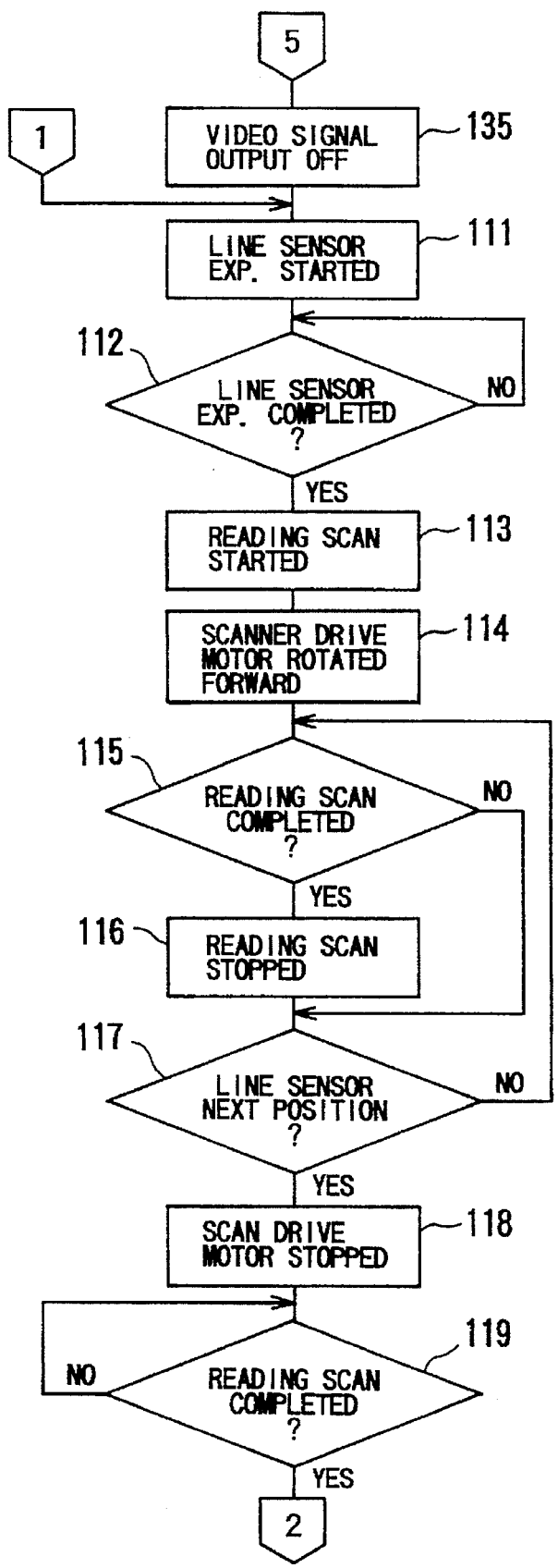
FIG. 5B is a second part of the flow chart of the reading operation of the first embodiment.
Figure 5C:
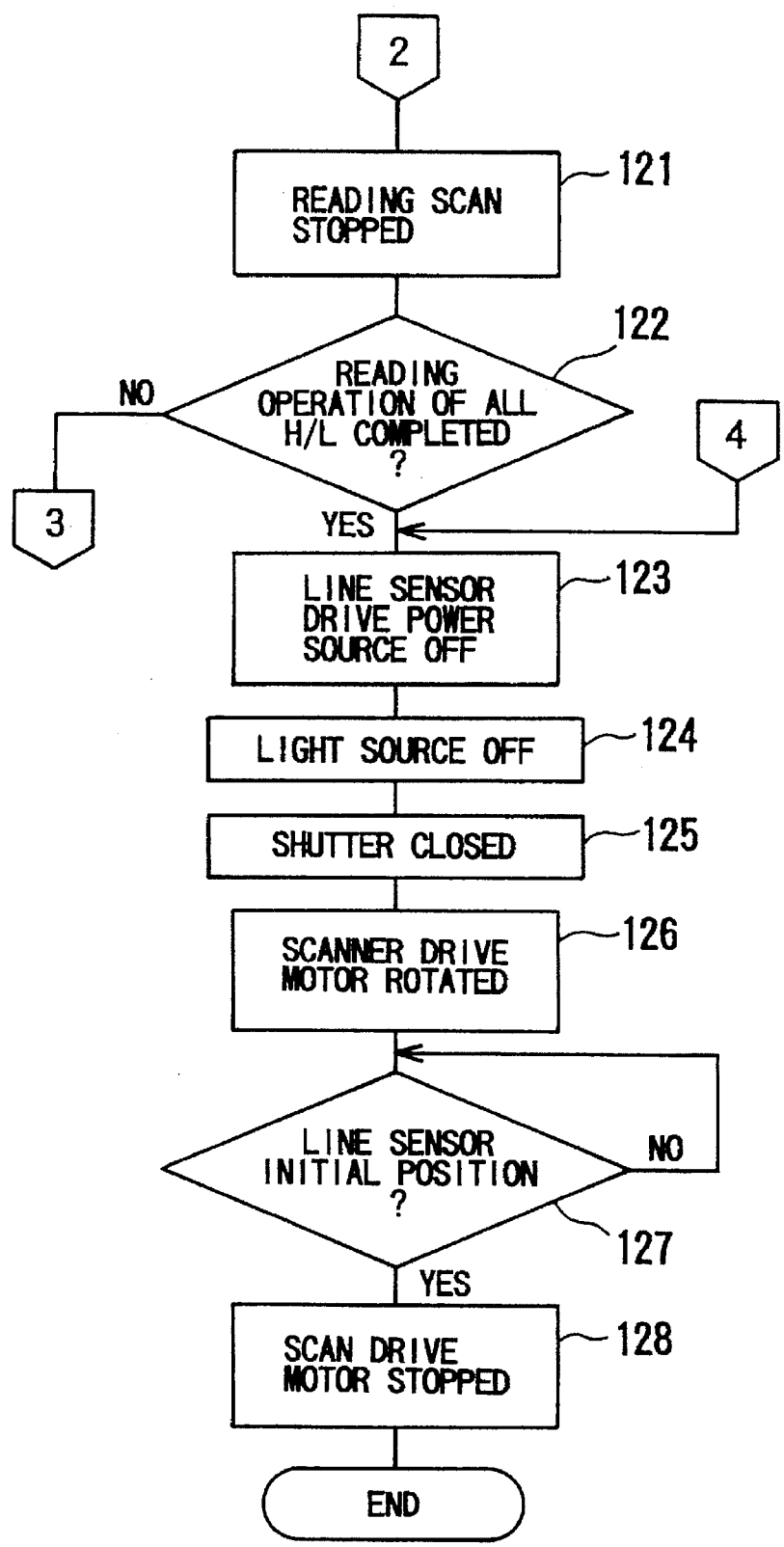
FIG. 5C is a third part of the flowchart of the reading operation of the first embodiment.
Figure 6A:
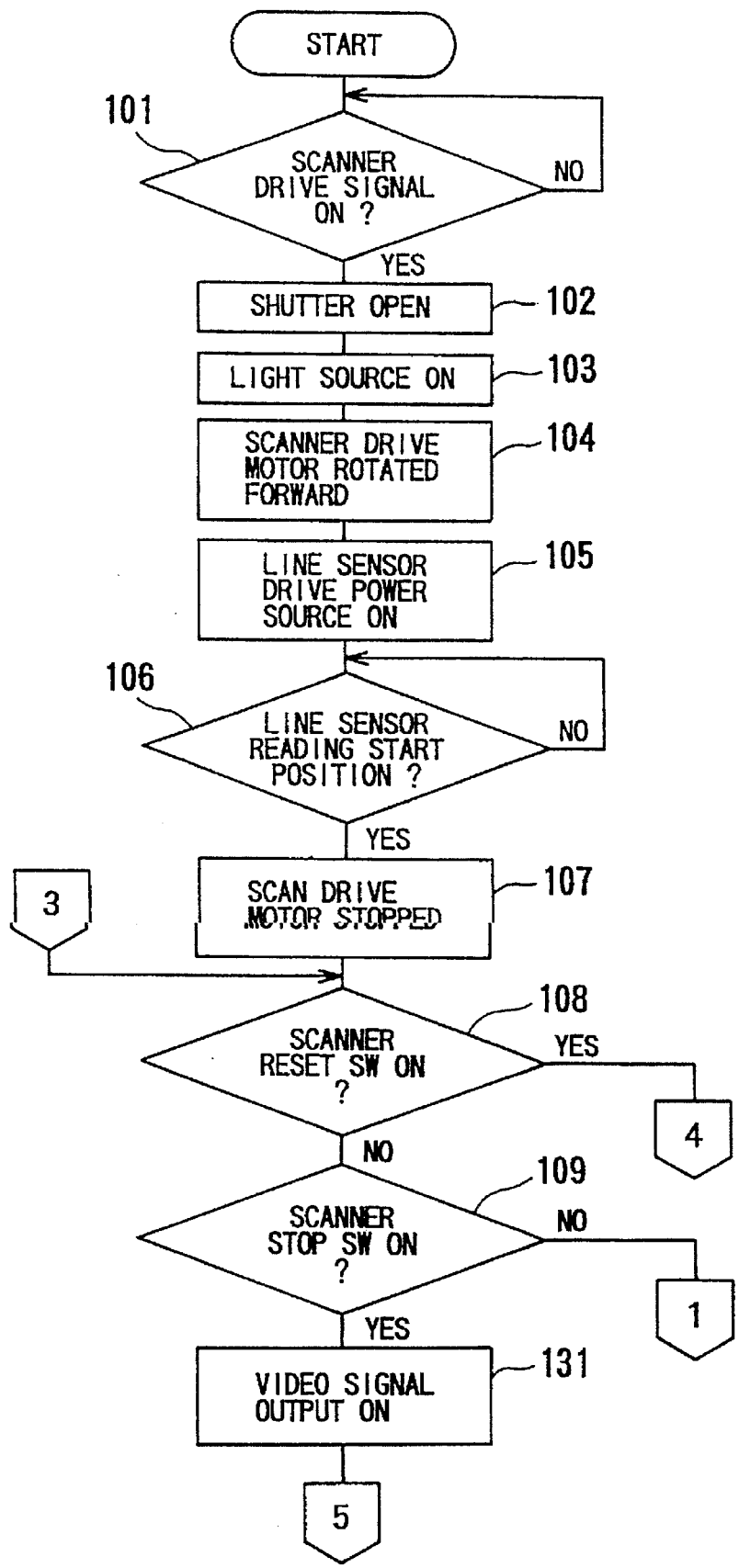
FIG. 6A is a first part of a flowchart of a reading operation of a second embodiment.
Figure 6B:
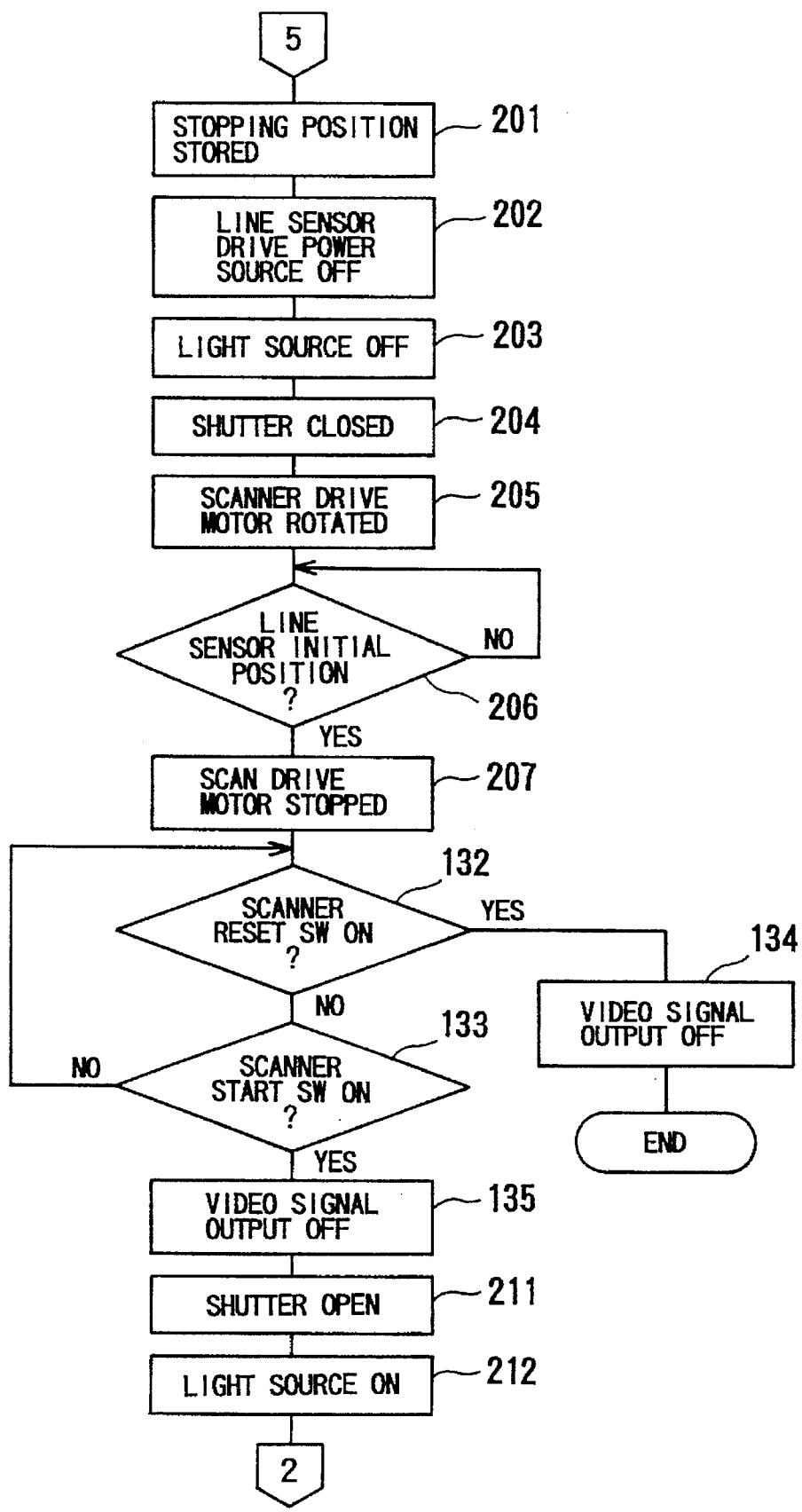
FIG. 6B is a second part of the flowchart of the reading operation of the second embodiment.
Figure 6C:
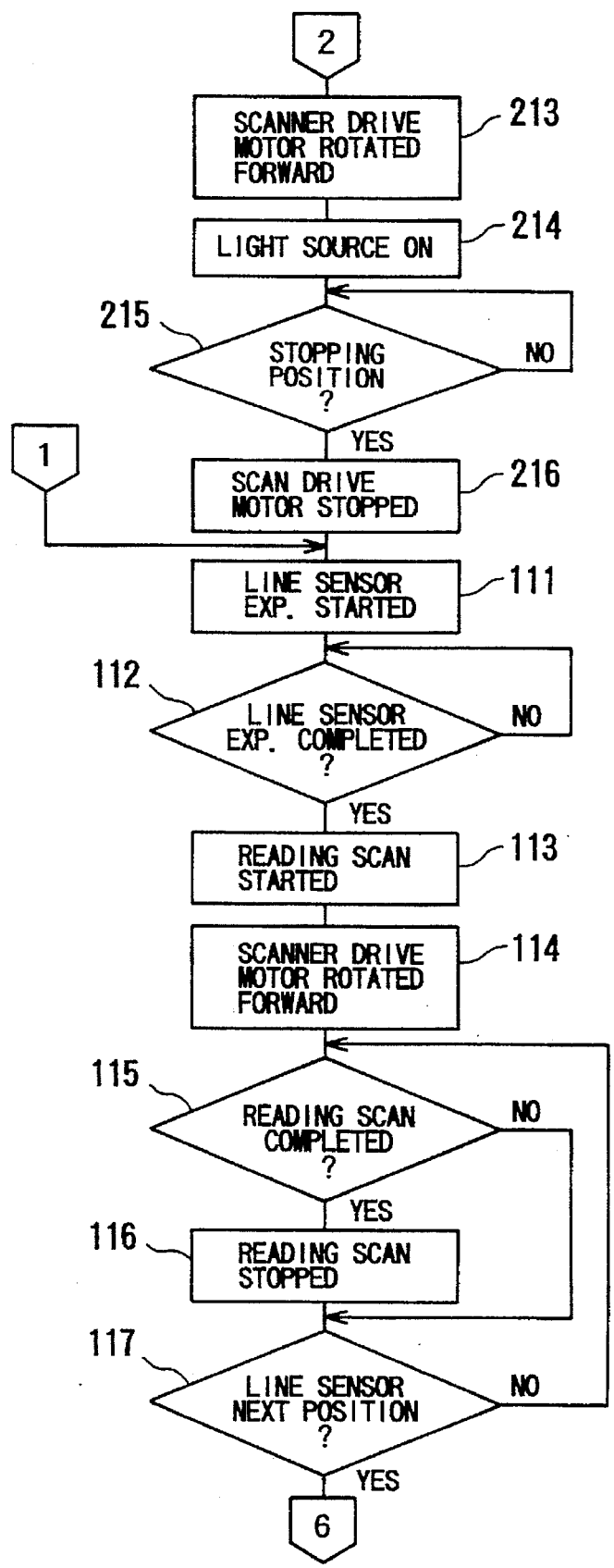
FIG. 6C is a third part of the flowchart of the reading operation of the second embodiment.
Figure 6D:
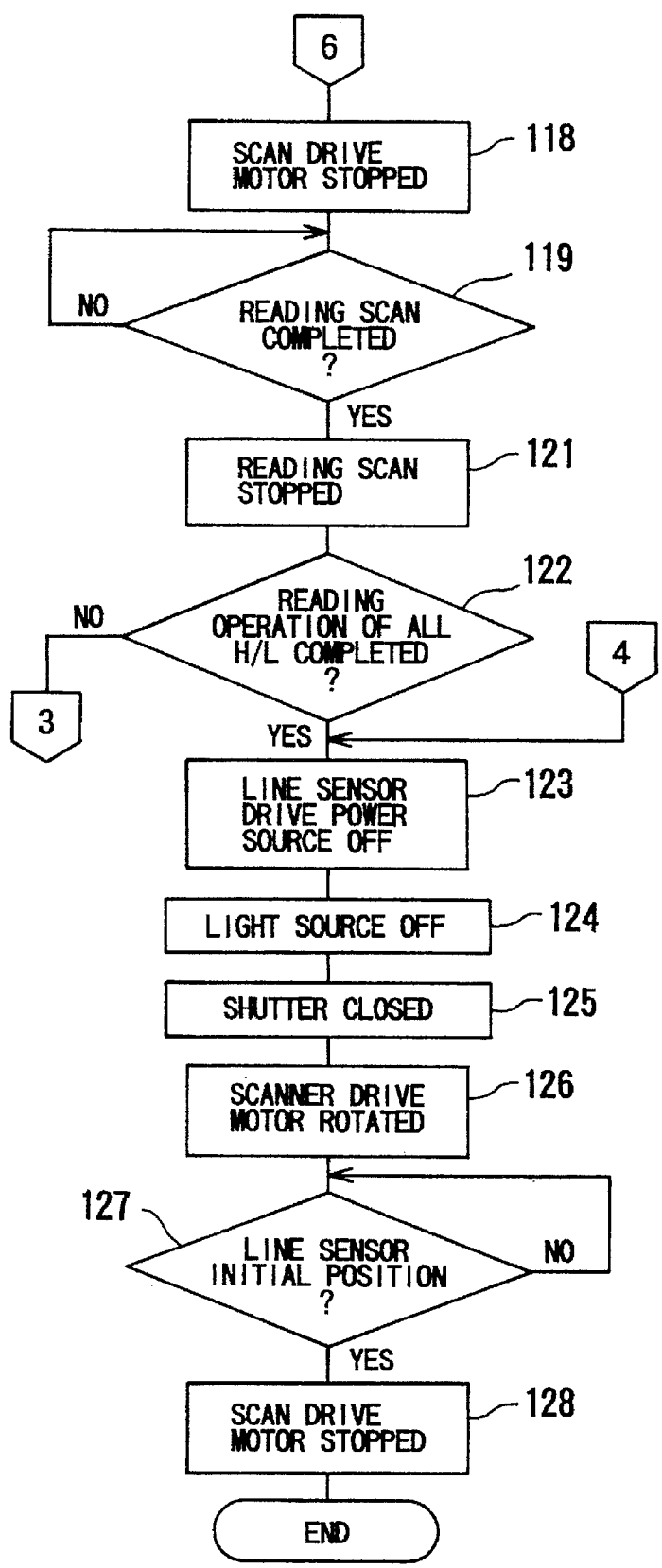
FIG. 6D is a fourth part of the flowchart of the reading operation of the second embodiment.

FIG. 5A, 5B and 5C are flowcharts of the reading operation of the pixel signals. With reference to these drawings, an operation of the embodiment will be described.

When it is confirmed in Step 101 that a scanner drive signal has been outputted, the shutter 22 is opened in Step 102, and the light source 42 is lit in Step 103. Then, a scanner drive signal is outputted in Step 104, so that the scan drive motor 55 rotates in a forward direction, and the moving member 52 of the scanning mechanism 50 starts to move upward from the lowest position of the electro-developing recording medium 30, i.e., from the initial position of the scanning mechanism 50. In Step 105, a line sensor drive power source included in the line sensor drive circuit 47 is turned ON.

When it is confirmed in Step 106 that the line sensor 44 is set at a reading start position (i.e., the first horizontal scanning line of the image to be scannned), then the output of the scanner drive signal is stopped in Step 107, and thus the scan drive motor 55 is stopped. This stopping operation is controlled by counting pulse signals, for example, used for rotating the scan drive motor 55.

Then, in Step 108, it is determined whether the scanner reset switch 18 is set in an ON state, and in Step 109, it is determined whether the scanner stop switch 16 is set in an ON condition. Now, suppose that each of the switchs 16 and 18 are set in an OFF condition. In this case, the process goes to Step 111 in which an exposure of the line sensor 44 is started, so that electric charge accumulation in the line sensor 44 is performed. When it is confirmed in Step 1122 by sensing that a constant time has passed, for example, that the exposure of the line sensor 44 has been completed,. in Step 113, a reading scan of the line sensor 44 is started, and pixel signals of one horizontal scanning line are outputted from the line sensor 44 and stored in the memory 64. In Step 1142 the scanner drive signal for operating the scan drive motor 55 in a forward direction is outputted, so that the moving member 52 starts to move upward.

During movement of the moving member 52, when it is confirmed in Step 115 that the reading scan has been completed, the reading scan is stopped in Step 116, and thus the storing operation of the memory 64 is stopped. Note that the completion of the reading scan is controlled by counting pulse signals, for example, which are outputted from the line sensor drive circuit 47 to drive the line sensor 44. When the completion of the reading scan is not confirmed in Step 115, Step 116 is skipped and Step 117 is executed, so that it is determined whether or not the line sensor 44 has been set at the position of the next horizontal scanning line, i.e., the next reading position. When the line sensor 44 has not been set at the position of the next horizontal scanning line, Steps 115 through 117 are executed again.

When it is confirmed in Step 117 that the line sensor 44 has been set at the position of the next horizontal scanning line, the output of the scanner drive signal is stopped in Step 118, and thus the scan drive motor 55 is stopped. This stopping operation is controlled by counting pulse signals for operating the scan drive motor 55, for example. Then, in Step 119, the completion of the reading scan of the line sensor 44 is confirmed similar to Step 115, and the reading scan and the storing operation of the memory 64 are stopped in Step 121. Namely, even when the loop of Steps 115 through 117 ends without executing Step 116, the reading scan of the line sensor 44 is completed in Step 121.

In Step 122, it is determined whether a reading operation for all of the horizontal scanning lines has been completed, by counting the value of a number counter which has been counted in Step 118, for example. The number of all of the horizontal scanning lines may be 2000, for example. When the reading operation of all of the horizontal scanning lines has not been completed, the process returns to Step 108, and the operations described above which are Steps 108, 109, 111 through 119, 121 and 122 are executed again.

Thus, the line sensor 44 is repeatedly moved and then stopped after a predetermined time and by a predetermined amount, by the scanning mechanism 50, so that the line sensor 44 moves on the imaging plane of the scanner optical system 43 to scan the image developed by the electro-developing recording medium 30, and the pixel signals are read out while the line sensor 44 moves.

When all of the horizontal scanning lines have been read out, the process goes from Step 122 to Step 123. In Step 123, the drive power source of the line sensor 44 is turned OFF, and in Step 12, the light source 42 is turned OFF. In Step 125, the shutter 22 is closed, and in Step 126, a scanner drive signal for operating the scan drive motor 55 in the rearward direction is outputted, and thus the moving member 52 starts to descend.

During the descending movement of the moving member 52, when it is confirmed in Step 127 that the line sensor 44 has returned to the initial position of the scanning mechanism 50, the output of the scanner drive signal is stopped in Step 128, so that the scan drive motor 55 is stopped, and this program ends. Note that the operation of Step 127 is performed based on a signal outputted by an operation in which the projection plate 58 interrupts the photo-interrupter 57.

If the scanner stop switch 16 is turned ON while pixel signals of the electro-developing recording medium 30 are read out through the line sensor 44, the process goes from Step 109 to Step 131, in which a video signal is outputted through the video signal output terminal 19 in a state in which the scanning operation of the scanning mechanism 50 is stopped. Namely, a program for reading out the image signals (i.e., pixel signals) stored in the memory 64 is executed, and the image corresponding to the image signals, which have been stored in the memory 64 by the time when the sensing operation of the line sensor 44 is stopped by the stopping operation of the scanner stop switch 165 is indicated on a display device or the video monitor device 71.

Note that the sensing operation of the line sensor 44 is stopped after pixel signals, which are generated in the line sensor 44 and correspond to one horizontal scanning line of the image, are read out from the line sensor 44. In an image indicated on the video monitor device 71, a white portion is indicated, for example, corresponding to any part of the memory 64 in which pixel signals are not stored.

Then, it is determined in Step 132 whether or not the scanner reset switch 18 has been turned ON, and it is determined in Step 133 whether or not the scanner start switch 16 has been turned ON. When neither of these switches 16, 18 has been turned ON, Steps 132 and 133 are repeatedly executed, and during the execution of Steps 132 and 133, the image which has been scanned so far, corresponding to a midway of the frame, is indicated on the video monitor device 71.

When it is determined in Step 132 that the scanner reset switch 18 has been turned ON, the process goes to Step 134 in which the program for reading out the image signals (i.e., pixel signals) stored in the memory 64 is stopped, and thus the output operation of the video signal to the video monitor device 71 is stopped. Then, the process goes to Step 123, and thus Steps 123 through 128 are executed. Namely, the scan drive motor 55 is rotated in the rearward direction so that the moving member 52 descends, and the line sensor 44 is returned to the initial position due to the operations of Steps 127 and 128. Note that, when it is determined in Step 108 that the scanner reset switch 18 has been turned ON, the process goes to Step 123 so that Steps 123 through 128 are executed, similar to the above.

On the other hand, when it is determined in Step 133 that the scanner start switch 16 is turned ON, the execution of the program for reading out the image signals of the memory 64 is stopped in Step 135, and then Step 111 is executed. Namely, the operations following Step 112 are executed so that the line sensor 44 is restarted from the stopping position, and thus the remaining image, which is developed on the electro-developing recording medium 30 and which has not been read out by the line sensor 44, is scanned and stored in the memory 64. Thus, the scanner start switch 16 is provided for resuming the sensing operation of the line sensor 44 when the scanning mechanism 50 is stopped.

As described above, in the first embodiment, even if the whole of a first image developed by the electro-developing recording medium 30 has not been sensed by the line sensor 44, the sensing operation can be stopped, and a second image corresponding to the image signals, which have been stored in the memory by the time when the sensing operation is stopped, are indicated by the video monitor device 71. Namely, even when the scanning operation has not been completed, it can be promptly checked whether or not a desired image is being recorded on the electro-developing recording medium 30. When the desired image is being recorded, the line sensor 44 will restart the scanning operation from the position where the line sensor 44 was stopped. Accordingly, the line sensor 44 does not have to be returned to the initial position to perform the scanning operation for the whole of the recording area of the electro-developing recording medium 30. Conversely, when the desired image is not being recorded on the electro-developing recording medium 30, the scanning operations in which the line sensor 44 senses the image, should end immediately so that a useless scanning operation is prevented.

FIGS. 6A through 6D are flowcharts of a reading operation of a second embodiment. In these drawings, in the Steps in which the same operations are carried out as those in the first embodiment shown in FIGS. 5A through 5C, the same references as in FIGS. 5A through 5C are indicated, and the explanations thereof are omitted for these Steps.

In the second embodiment, the operations in Steps 101 through 109 and 131 are the same as those of the first embodiment. In Step 131, indication of an image by the video monitor device 71 is started, and then, in Step 201, the number of pulse signals for rotating the scan drive motor 55 is counted, so that the stopping position of the line sensor 44 is stored in a memory provided in the system control circuit 20.

In Step 202, a line sensor drive power source included in the line sensor drive circuit 47 is turned OFF, and in Step 203, the light source 42 is turned OFF. After the shutter 22 is closed in Step 204, a scanner drive signal for operating the scan drive motor 55 in the reverse direction is outputted in Step 205, and thus the moving member 52 starts to descend. Then, when it is confirmed in Step 206 that the line sensor 44 has returned to the initial position, the output of the scanner drive singal is stopped in Step 207, so that the scan drive motor 55 is stopped. Note that the initial position is a position where the line sensor 44 was positioned before starting the sensing operation.

Then, it is determined in Step 132 whether or not the scanner reset switch 18 has been turned ON, and it is determined in Step 133 whether or not the scanner start switch 16 has been turned ON. When neither of these switches 16, 18 has been turned ON, Steps 132 and 133 are repeatedly executed, and during the executions of Steps 132 and 133, the image which has been scanned so far, corresponding to a midway of the frame, is indicated by the video monitor device 71.

When it is determined in Step 132 that the scanner reset switch 18 has been turned ON, the process goes to Step 134 in which the program for reading out the image signals (i.e., pixel signals) stored in the memory 64 is stopped, and the reading operation, in which the image signals stored in the memory 64 are read out therefrom, is stopped. Namely, the output operation of the video signal to the video monitor device 71 is stopped. Then, this program ends.

Thus, according to the second embodiment, the line sensor 44 is always set at the initial position, in a case in which the moving member 52 of the sun-scanning mechanism 50 is stopped during a reading operation for the image developed on the electro-developing recording medium 30 and the image, which has been read out so far to that moment, is indicated by the video monitor device 71. Therefore, the line sensor 44 does not need to be returned to the initial position when the reading operation is stopped at the midway and the reading operation is restarted, this operation being different from the first embodiment.

On the other hand, when it is determined in Step 133 that the scanner start switch 16 has been turned ON, the output operation of the video signal to the video monitor device 71 is stopped in Step 135, the shutter 22 is opened in Step 211, and the light source 42 is turned ON in Step 212. Then the scan drive motor 55 rotates in a forward direction in Step 213, so that the moving member 52 of the scanning mechanism 50 starts to move upward. In Step 214, the line sensor drive power source included in the line sensor drive circuit 47 is turned ON. When it is confirmed in Step 215 that the line sensor 44 has been set at the stopping position stored in the memory in Step 201, the scan drive motor 55 is stopped in Step 216.

Namely, the line sensor 44 is set at a position from which the reading operation should be carried out again, and Steps 111 through 128 are executed so that the remaining image, which has not been read out through the line sensor 44, is read out from the electro-developing recording medium 30.

As described above, according to the second embodiment, the same effect as that obtained by the first embodiment is obtained, and further, since the line sensor 44 is returned to the initial position when the scanning mechanism 50 is stopped at a midway of a reading operation, the time, which is necessary for the developing operation of the electro-developing recording medium 30 to be started again, can be reduced.

Figure 7A:
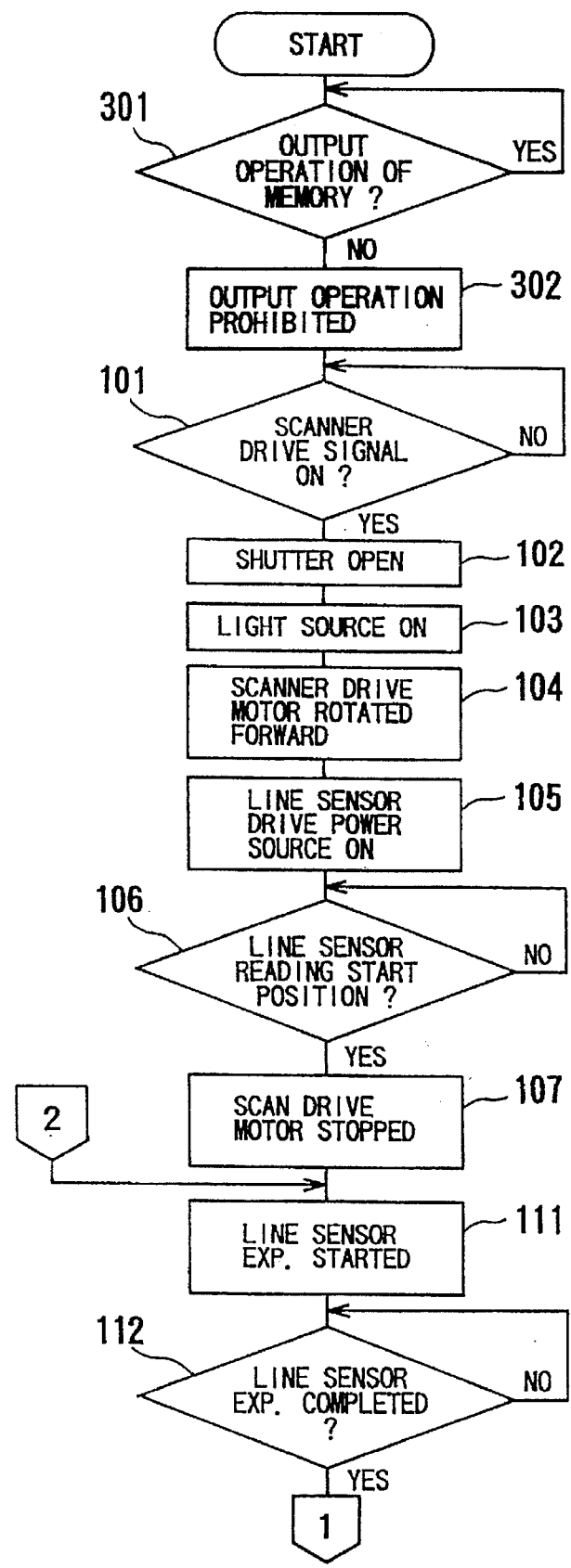
FIG. 7A is a first part of a flowchart of a reading operation of a third embodiment)
Figure 7B:
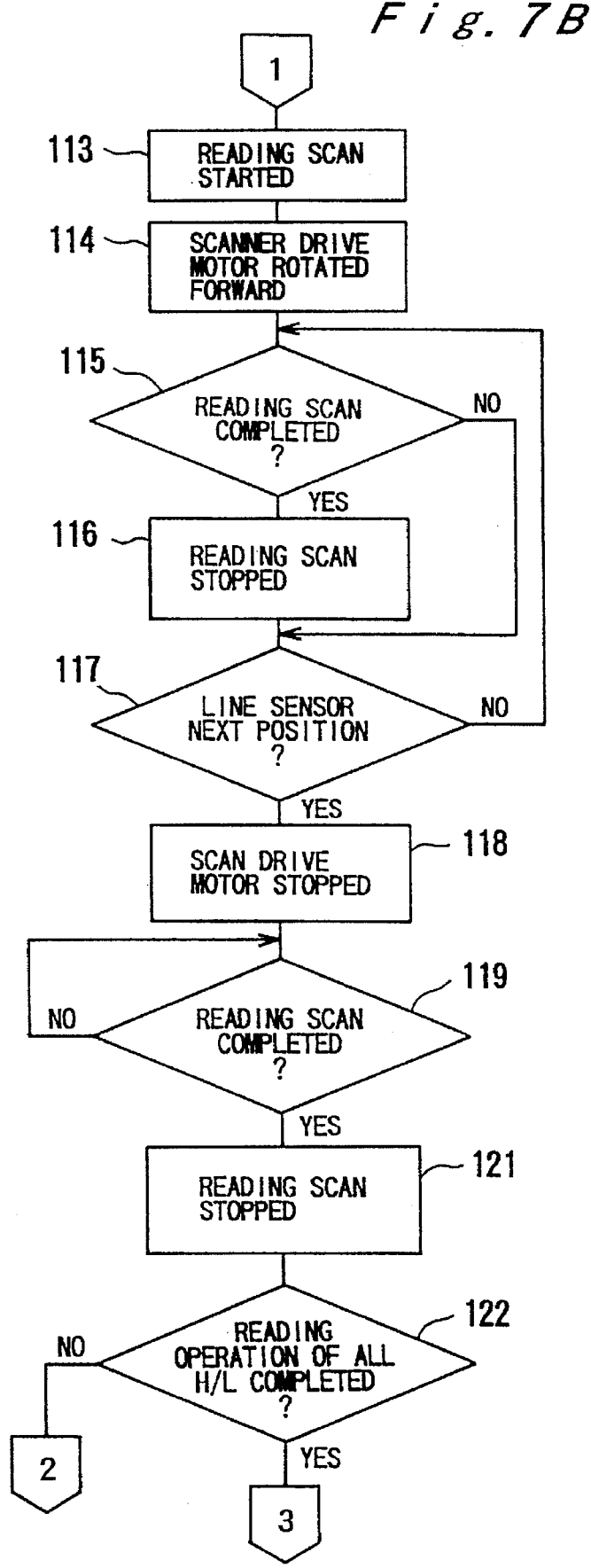
FIG. 7B is a second part of the flowchart of the reading operation of the third embodiment.
Figure 7C:
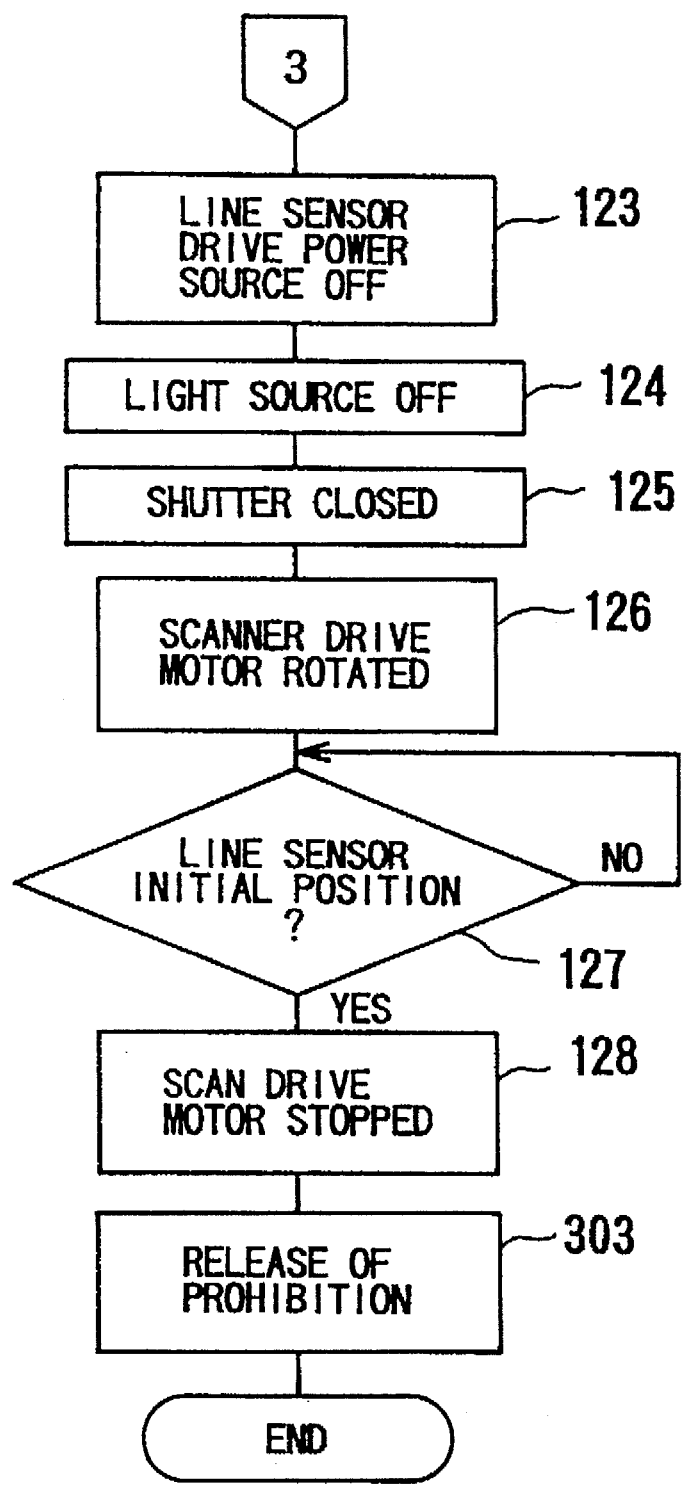
FIG. 7C is a third part of the flowchart of the reading operation of the third embodiment.

A third embodiment of the present invention will be described below with reference to FIGS. 7A through 7C, which are flowcharts of a reading operation of the third embodiment. Note that, in the third embodiment, the external structure and the block diagram of the still video camera are basically the same as those of the first embodiment. In FIGS. 7A through 7C, in the Steps in which the same operations are carried out as those in the first embodiment shown in FIGS. 5A through 5C, the same references as in FIGS. 5A through 5C are indicated, and the detailed explanations thereof are omitted for these Steps.

The reading operation shown in FIGS. 7A through 7C is started when the scanner start switch 16 is turned ON.

In Step 301, it is determined whether or not an output operation, in which an image signal stored in the memory 64 is read out therefrom, is being now carried out. This determination is performed based on a command signal inputted through the interface circuit 65 into the system control circuit 20 from an external computer provided outside the still video camera. When it is determined that the output operation is being carried out at present, Step 302 and the following Steps are not executed, so that operations, in which an image developed by the electro-developing recording medium 30 is sensed by the line sensor 44 and image signals corresponding to the image are stored in the memory 64, are prohibited.

Conversely, when it is determined in Step 301 that the command signal for reading out the image signals from the memory 64 has not been inputted from the external computer, and thus the output operation of the memory 64 is not to be carried out, Step 302 is executed. Thus, when image signals are to be stored in the memory 64, operations, in which the image signals are read from the memory 64 and outputted to the interface circuit 65 or the recording device control circuit 66, are prohibited. Then, in Steps 101 through 107, 111 through 119, and 121 through 128, the image is read out from the electro-developing recording medium 30, and the image signals corresponding to the image are stored in the memory 64.

The operations of Steps 101 through 107 are the same as those of the first embodiment. After Step 107 is executed, Step 111 is executed so that an exposure of the line sensor 44 is started. Then, Steps 112 through 119, and 121 through 128 are executed as described in the first embodiment with reference to FIGS. 5B and 5C.

After the execution of Step 128, Step 303 is executed so that the prohibition of the output operation of the memory 64 executed in Step 302 is released. Thus, the condition of the still video camera is changed to be able to perform operations in which the image signals are read from the memory 64 and outputted to the interface circuit 65 or to the recording device control circuit 66, and this program ends.

As described above, according to the third embodiment, when image signals are read from the memory 64 and outputted to an external device, an operation in which other image signals are stored in the memory 64 is prohibitted. Therefore, any useless storing operation is prevented from being carried out. Further, according to the third embodiment, when image signals stored in the memory 64 are read out therefrom, operations, in which another image developed on the electro-developing recording medium 30 is read out therefrom to store the corresponding image signal in the memory 64, are prohibited. Therefore, any meaningless image signal is prevented from being outputted from the still video camera.

Note that the electro-developing recording medium 30 is not restricted to the structure described above, and may be any other structure by which an image is electronically developed.

The line sensor 44 may be disposed in such a manner that a light beam reflected by the electro-developing recording medium 30 is sensed.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 6-339362 (filed on Dec. 28, 1994) and 7-016549 (filed on Jan. 6, 1995) which are expressly incorporated herein, by reference, in their entirety.

I claim:

1. An image sensing operation control device, comprising:
   an electro-developing recording medium that electronically develops an image formed thereon;
   an image sensor for sensing a part of said developed image;
   means for moving said image sensor in a scanning direction that is substantially perpendicular to a longitudinal direction of said image sensor to perform a scanning operation, so that said developed image is sensed by said image sensor;
   a memory for storing image signals corresponding to said developed image sensed by said image sensor;
   means for stopping said scanning operation of said image sensor prior to a completion of said scanning operation so that a partial scan of said developed image is obtained; and
   means for indicating said stored image signals on a display device.

2. A device according to claim 1, wherein said electro-developing recording medium comprises an electrostatic information recording medium that generates an electric charge in accordance with an image formed thereon, and an electric charge keeping medium which generates a visible image in accordance with said electric charge and which can keep said visible image.

3. A device according to claim 2, wherein said electric charge keeping medium comprises a liquid crystal display having a memory-type liquid crystal.

4. A device according to claim 1, further comprising a light source that illuminates said electro-developing recording medium, a scanner optical system disposed on an optical path of a light beam which is generated by illuminating said electro-developing recording medium by said light source, and a scanning mechanism that moves said image sensor on an imaging plane on which said developed image is formed by said scanner optical system, to sense said developed image.

5. A device according to claim 4, wherein said image sensor comprises a line sensor that senses one horizontal scanning line of said developed image.

6. A device according to claim 4, wherein said stopping means comprises a scanner stop switch for stopping said scanning mechanism, said indicating means comprising means for reading said stored image signals when said scanner stop switch is operated.

7. A device according to claim 6, further comprising means for returning said image sensor to an initial position when said scanner stop switch is operated, said initial position being a position where said image sensor is positioned before starting said scanning operation.

8. A device according to claim 6, further comprising a scanner reset switch for stopping a reading operation of said reading means.

9. A device according to claim 4, further comprising a scanner start switch for resuming said scanning operation when said scanning mechanism is stopped.

10. A device according to claim 9, wherein said scanning mechanism starts said image sensor from a position where said image sensor has been stopped, when said scanner start switch is operated.

11. A device according to claim 1, wherein said stopping means stops said scanning operation after pixel signals generated in said image sensor are read out therefrom, said pixel signals corresponding to one horizontal scanning line of said image.

12. An image sensing operation control device, comprising:

an electro-developing recording medium that electronically develops an image formed thereon;

an image sensor that senses a part of said developed image;

means for moving said image sensor in a scanning direction substantially perpendicular to a longitudinal direction of said image sensor so that said developed image is sensed;

a memory for storing image signals corresponding to said developed image sensed by said image sensor;

means for storing said image signals in said memory;

means for reading said image signals from said memory; and means for controlling operations of said image sensor, said storing means and said reading means, in such a manner that said image sensor, said storing means and said reading means are prohibited from being operated at the same time.

13. A device according to claim 12, wherein said controlling means prohibits an operation of said storing means when said reading means reads said image signals from said memory.

14. A device according to claim 13, wherein said controlling means prohibits an operation of said image sensor when said reading means reads said image signals from said memory.

15. A device according to claim 12, wherein said controlling means prohibits an operation of said reading means when said storing means stores said image signals in said memory.

16. A device according to claim 12, wherein said electro-developing recording medium comprises an electrostatic information recording medium generating an electric charge in accordance with an image formed thereon, and an electric charge keeping medium which generates a visible image in accordance with said electric charge and which can keep said visible image.

17. A device according to claim 16, wherein said electric charge keeping medium is a liquid crystal display having a memory-type liquid crystal.

18. A device according to claim 12, further comprising a light source illuminating said electro-developing recording medium, a scanner optical system disposed on an optical path of a light beam which is generated by illuminating said electro-developing recording medium by said light source, and a scanning mechanism moving said image sensor on said imaging plane to sense said developed image, said image sensor being able to be moved in an imaging plane on which said developed image.

19. A device according to claim 18, wherein said image sensor comprises a line sensor that senses one horizontal scanning line of said developed image.

20. A device according to claim 12, wherein said reading means reads said image signals to output said image signals to an image recording device so that said image signals are recorded in an IC card.

* * * * *